CONTINUOUS PROCESS FOR FORMING POLYLACTAMS

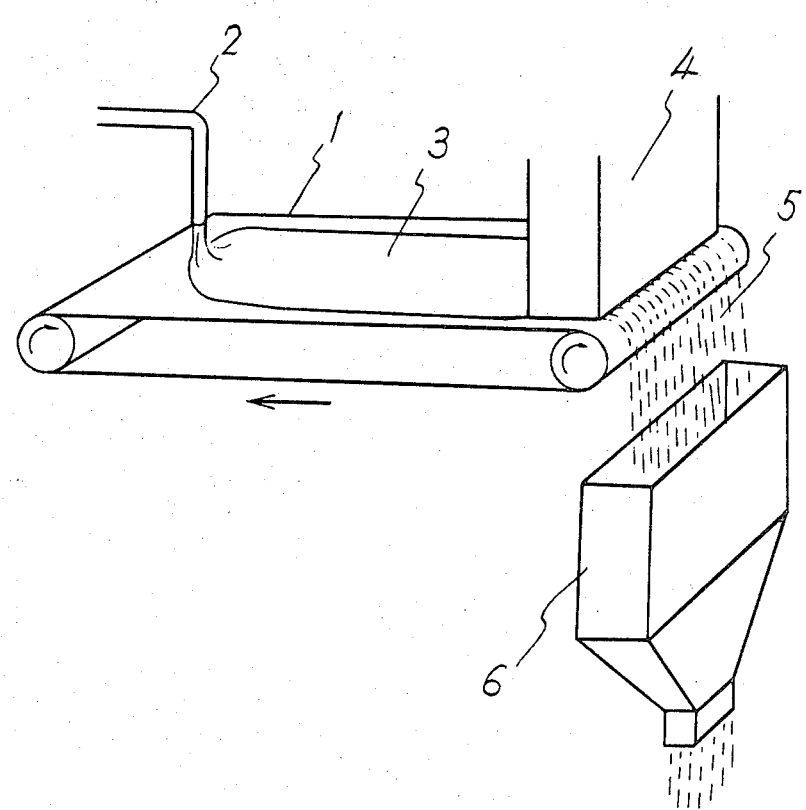

Tadashi Takamiya, Masaya Kurata, and Tomiaki Kimura, Tokyo, Kazuyoshi Hisamoto, Kawasaki, and Yasuhiro Ohmura, Tokyo, Japan, assignors to Alrac Corp., Stamford, Conn., and Mitsubishi Chemical Industries Limited, Tokyo, Japan
Filed Feb. 22, 1972, Ser. No. 228,164
Claims priority, application Japan, Feb. 23, 1971, 46/8,740
Int. Cl. C08g 20/16
U.S. Cl. 260—78 P      6 Claims

ABSTRACT OF THE DISCLOSURE

A continuous process for polymerizing lactams comprises polymerizing the lactam in sheet form, breaking up the sheet into pellets or particles, and completing the polymerization of the lactam in the particles.

---

The present invention relates to a process for manufacturing polyamides.

Production of polyamides by polymerizing lactams using an alkaline catalyst is generally conducted by mixing a lactam, an alkaline catalyst, and a polymerization initiator, and subsequently polymerizing at a somewhat higher temperature than the melting point of the lactam. In such alkaline polymerization, the reaction system can be kept homogeneous only at the initial stage of the reaction, the polymerization rapidly proceeding to give a heterogeneous mixture of liquid and solid, and finally the entire system solidifies. For that reason, a common stirrer-type reactor cannot be employed and continuous operations are practically almost impossible.

In addition, the resultant polymer is a solid mass containing the unreacted lactam and the catalyst. Consequently, it is very difficult to wash or pelletize the polymer in such form prior to subsequent processes, such as molding and spinning. For instance, in the production of a polymer of 2-pyrrolidone, polymerization occurs immediately after mixing 2-pyrrolidone with 3% potassium hydroxide as a catalyst, and 1% N-acetylpyrrolidone as an initiator in a dry state. The viscosity reaches 1000 poises at 50° C. in 2.5 minutes, and the reaction system completely loses its fluidity after 3 minutes, the conversion of monomer to polymer being 20–30 percent or so at this time. Subsequently, the polymerization proceeds with the mixture being totally solidified. In general, the reaction is stopped at a conversion of monomer to polymer of 65 to 75%.

It is possible to charge the starting materials to a suitable vessel and maintain a desired temperature to complete the reaction; the resultant polymer, however, is a very solid mass confined to the vessel as previously mentioned. It is, therefore, not recommended to employ such a process, for a large energy is required to pelletize or grind the solid polymer, and the size of the pellets or particles thus obtained is not uniform.

The present invention is based on the discovery that uniform pellets or particles of a polyamide can be easily obtained by forming the polymer into sheet-form while it still maintains fluidity, converting the sheet into particles when the polymer is hard enough to be cut into pieces, and then completing the polymerization to the desired degree while the polymer is in particle form.

More specifically, this invention provides a commercially practical process for manufacturing polyamides, by shaping the polymer into sheet-form while it still maintains fluidity, forming particles or pellets from the sheet when the conversion of monomer to polymer is 20 to 70%, preferably 20 to 50%, and then carrying on the polymerization while the polymer is in particle form.

The lactams which may be employed in this invention include 2-pyrrolidone, caprolactam, enantholactam, capryllactam, caprinlactam and laurillactam, and derivatives thereof having one or more $C_1$-$C_6$ aliphatic substituents on the carbon atoms in the ring. The lactams may be employed alone or as a mixture of more than two kinds of lactams. Preferably, $C_4$ to $C_{16}$ lactams are used.

The alkaline polymerization catalyst may be any of those well known in the art for use in the alkaline polymerization of lactams, such as hydroxides, hydrates, carbonates and alcoholates of the alkali metals, e.g. potassium hydroxide, and sodium hydroxide, alkali metal salts of the lactams and organic bases such as quaternary ammonium hydroxides.

The polymerization initiator may be any of those well known in the art for use in the alkaline polymerization of lactams, such as N-substituted imido compounds, e.g. N-acyllactams such as N-acetyllactams, isocyanates, e.g. phenyl isocyanate, and acid chlorides, acid anhydrides, cyclic esters, and $CO_2$ etc.

The amount of the alkaline polymerization catalyst and the polymerization initiator may be the same as those in the known processes for the alkaline polymerization of lactams.

The polymerization temperature, which depends upon the lactam used, may be somewhat higher than the melting point of the lactam employed, e.g. 30 to 60° C., more preferably 40 to 50° C., for 2-pyrrolidone, and 120 to 250° C., more preferably about 150° C. for caprolactam.

In the case of 2-pyrrolidone, it is necessary to conduct the polymerization in the substantial absence of water, because the presence of water prevents the polymerization.

An embodiment of the present invention is illustrated in the accompanying drawing.

Referring to the drawing, there is shown an apparatus which may be used in manufacturing polyamides in accordance with this invention. From a feedline 2 a feedstock solution, i.e. a mixture of a lactam, an alkaline polymerization catalyst, and a polymerization initiator, is discharged at a constant temperature on endless belt 1 operating in the direction as indicated by the arrow. Belt 1 may be of metal or an inert resin. The mixture must be discharged from feedline 2 while it maintains fluidity, although the polymerization is advanced to some degree. The endless belt 2 may be equipped with means for heating or cooling (not shown) if necessary. The discharged feedstock solution spreads as a sheet 3 over the endless belt 1, which moves the sheet 3 toward cutter 4. Cutter 4 may be any of various kinds of cutting means, a cutter having a rotary edge being advantageously employed.

The conversion of monomer to polymer in sheet 3 increases as the sheet 3 moves along the belt 1, and the polymer must be hard enough to cut when the sheet 3 reaches the cutter 4. Suitably, the conversion of monomer to polymer in sheet 3 when the sheet reaches the cutter is in the range of 20 to 70%, preferably 20 to 50%. If the sheet is subjected to cutting before it reaches about 20% conversion, difficulties would be encountered, such as exudation of the polymer or cohesion of the freshly pelletized polymer. On the other hand, while it is not impossible to pelletize a polymer having a higher degree of conversion than 70%, this is sometimes rather disadvantageous if the polymerization reaction is slow, since then the distance between the feedline 2 and the cutter 4 must be very long to provide sufficient time for the polymerization to reach these high conversions.

In general, the polymer will be at a proper degree of conversion for pelletization if the velocity of the endless belt 1 and the rate of discharge of the feedstock solution through feedline 2 are controlled so that the sheet 3 reaches the cutter 4 in about 3 hours, preferably about 1.5 hours, with the degree of conversion being 20 to 70%, preferably 20 to 50%.

Any shape and size of the pellets or particles may be employed, as long as it does not interfere with the washing of the pellets. It is, however, desirable to cut the polymer into pellets of uniform shape and size, suitable for sending to a conventional melt-molding machine.

The pellets 5 formed by the cutter 4 are introduced into a polymerization vessel 6, in which the polymer is retained until the desired conversion is attained, usually over 65%. It will be understood that any type of vessel can be used as the vessel 6. The pellets thus obtained are, in general, washed with water or an aqueous solution to extract the unreacted lactam and the catalyst, and dried to give a final product.

The present invention is readily adapted to batch or continuous operation, with continuous operation being presently preferred. An advantage of the present invention is that the polymerization of lactams may be effected in apparatus that does not take up much room. Particularly, this invention is advantageous for the polymerization of 2-pyrrolidone, which requires a long period of time to complete the polymerization due to its slow rate of polymerization.

This invention will be further described with the following examples. It will be understood that this invention is not restricted by these examples. References to parts in the examples are to parts by weight.

EXAMPLE 1

2-pyrrolidone was continuously polymerized with an apparatus as substantially shown in the accompanying drawing, comprising a polyethylene endless belt 1 having an effective length of 10 m. and a width of 0.3 m., a Horai-type pelletizer (manufactured by Horai Iron Works Co.) as a cutter 4, and a square-shaped vessel having dimensions of 0.3 m. wide x 0.6 m. deep x 1 m. high as polymerization vessel 6.

8 parts of potassium hydroxide were added to 100 parts of 2-pyrrolidone, and the water formed was distilled off at a reduced pressure. $CO_2$ gas was bubbled through the mixture until 30% of the potassium hydroxide was neutralized, and 0.05 parts of phenylisocyanate was added to the mixture to prepare a feedstock solution.

The feedstock solution was discharged from a feedline 2 at a rate of 60 cc. per min. on the endless belt 1 which was kept at 50° C. and operated at a velocity of 0.1 m. per min. in the direction as indicated by the arrow in the drawing. The period of time to reach the cutter was 1.5 hours. The degree of conversion of polymer in the pellets was 30%. The dimensions of pellets were 4 mm. x 4 mm. x 2 mm. The pellets were retained at 50° C. for 20 hours in the polymerization vessel 6. The polymer thus obtained had a deree of conversion of 65% and was in a pellet form easy to handle.

EXAMPLE 2

Employing the same apparatus as in Example 1, polypyrrolidone was continuously produced by bubbling $CO_2$ gas through a mixture of 100 parts of 2-pyrrolidone and 20 parts of trimethylbenzyl ammonium hydroxide to neutralize the base to an extent of 30%. The polymerization was conducted using the conditions of Example 1, except that the period of time to reach the cutter was 1 hour and the retaining period of the polymer in the vessel 6 was 10 hours.

The degree of conversion on the polymer in the pellets was 30%. The resultant polymer was in the form of easy-to-handle pellets having a degree of conversion of 65%.

We claim:

1. In the polymerization of a lower lactam having 4 to 5 carbon atoms in the lactam ring in the presence of an alkaline polymerization catalyst and a polymerization initiator and in the substantial absence of water, the improvement which comprises: forming the polymerizate into a sheet while the polymerizate is still fluid, polymerizing the lower lactam in the polymerizate, subdividing said sheet into a plurality of particles when the conversion of the lower lactam therein to polymer is from about 20% to about 70% and sufficient to enable said subdivision, said conversion being less than the final degree of conversion of said lower lactam to polymer, and completing the polymerization of the lower lactam by polymerizing the lactam in said particles to the final degree of conversion of said lower lactam to polymer.

2. The process according to claim 1, wherein said lactam is 2-pyrrolidone.

3. The process according to claim 2 which is carried out in a continuous manner.

4. The process according to claim 3, wherein the lactam is 2-pyrrolidone, the alkaline polymerization catalyst is an alkali metal or quaternary ammonium hydroxide and the polymerization initiator is $CO_2$.

5. The process according to claim 4, in which said sheet is formed on a moving support and is moved by the support to a cutting zone at a velocity and along a path of predetermined length such that the degree of conversion of 2-pyrrolidone to polymer in said sheet is at least about 20% when the sheet reaches the cutting zone, the sheet being subdivided into said particles in the cutting zone.

6. The process according to claim 5, wherein degree of conversion in said sheet is from about 20% to about 50%, and the final degree of conversion is 65 to 75%.

References Cited

UNITED STATES PATENTS 3,681,293   8/1972   Jarovitzky et al.   260—78 P
2,739,959   3/1956   Ney et al.   260—78 P
2,907,755   10/1959   Lautenschlager et al.   260—78 P HAROLD D. ANDERSON, Primary Examiner U.S. Cl. X.R.

260—78 L, 95 C